United States Patent
Hopple et al.

(10) Patent No.: US 6,519,769 B1
(45) Date of Patent: Feb. 11, 2003

(54) AUDIENCE MEASUREMENT SYSTEM EMPLOYING LOCAL TIME COINCIDENCE CODING

(75) Inventors: Michael Robert Hopple, Schenectady, NY (US); Richard Louis Frey, Delanson, NY (US); Donald Thomas McGrath, Scotia, NY (US); Robert John Dunki-Jacobs, Mason, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/188,127

(22) Filed: Nov. 9, 1998

(51) Int. Cl.⁷ .................................................. H04N 7/16
(52) U.S. Cl. ........................................ 725/14; 725/18
(58) Field of Search ........................ 725/17, 18, 9, 725/14, 15, 19, 20

(56) References Cited

U.S. PATENT DOCUMENTS

| | | | | |
|---|---|---|---|---|
| 4,764,808 A | * | 8/1988 | Solar | 725/17 |
| 5,764,763 A | * | 6/1998 | Jensen | 380/253 |
| 5,881,360 A | * | 3/1999 | Fong | 725/18 |
| 5,889,548 A | * | 3/1999 | Chan | 725/17 |

OTHER PUBLICATIONS

"Television Viewership Monitoring System Employing Audio Channel and Synchronization Information," Robert J. Dunki–Jacobs et al., Ser. No. 08/892,033 (GE docket RD–25283), filed Jul. 14, 1997.

* cited by examiner

*Primary Examiner*—Andrew Faile
*Assistant Examiner*—Hunter Lonsberry
(74) *Attorney, Agent, or Firm*—John F. Thompson; Patrick K. Patnode

(57) ABSTRACT

The present invention provides a system for recording a viewer's television viewership habits. Sensors monitor the audio signal, synchronization signal, and video signal emanating from the television. A time coincidence channel tag is mixed with the transmitted television audio or video signal at a dwelling by a master unit. Then by matching the channel tag of the viewed channel with the channel tag, an accurate identification of the viewed channel can be made.

20 Claims, 3 Drawing Sheets

AUDIENCE MEASUREMENT SYSTEM EMPLOYING LOCAL TIME COINCIDENCE CODING

BACKGROUND OF THE INVENTION

This invention relates to a system for monitoring and collecting data on the viewing habits of television viewers. More specifically this invention relates to an apparatus and method for monitoring and collecting data on the viewing habits of television viewers employing local time coincidence coding.

Previous attempts to measure viewership patterns have been employed using intrusive measurement techniques (i.e. physical modification of the television receiver) relying on inferential measurement (i.e. measuring radio frequency of the local oscillator), and priori encoding tags inserted at the program origination point. It is desirable to make unilateral measurement of the natural program content using direct observation to determine viewership preferences. It is also desirable to make measurement of the natural program content without introducing changes into the television signal at the program origination point.

BRIEF SUMMARY OF THE INVENTION

The present invention addresses the foregoing needs by providing an electronic television viewership monitoring system composed of a master unit which mixes an audio priori tag and a video priori tag on each channel of a television source signal within a dwelling, and a least one remote module which monitors the output of a respective television receiver via magnetic sensors and transmits a channel window interval signal having the priori tag encoded therein and a television status signal to the master unit. The master unit correspondingly identifies the channel being viewed by each respective television. The audience measurement system stores the viewership information and periodically reports the viewership information via a communications link to a central computer.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
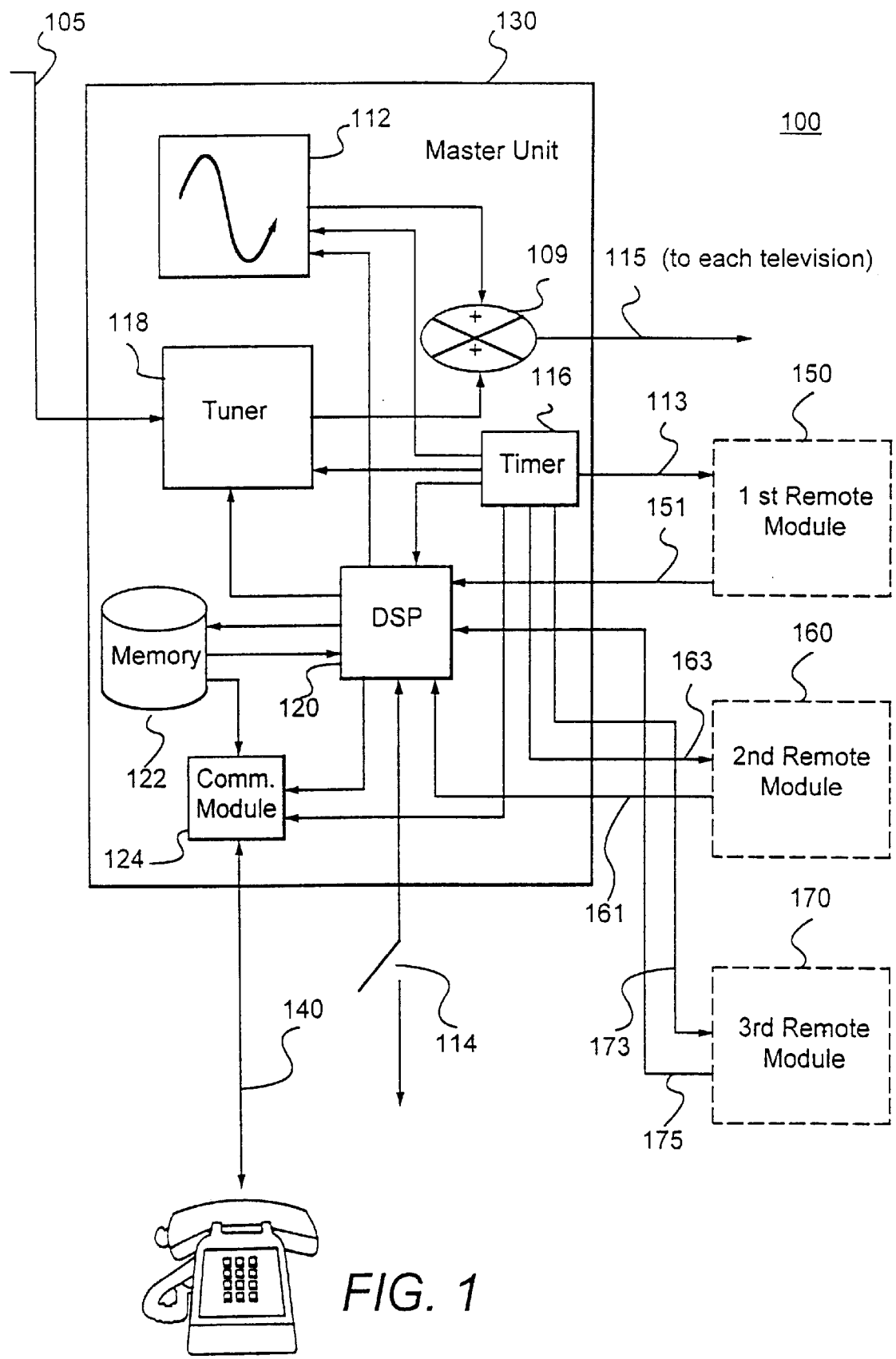
FIG. 1 is a system block diagram of the present invention.
Figure 2:
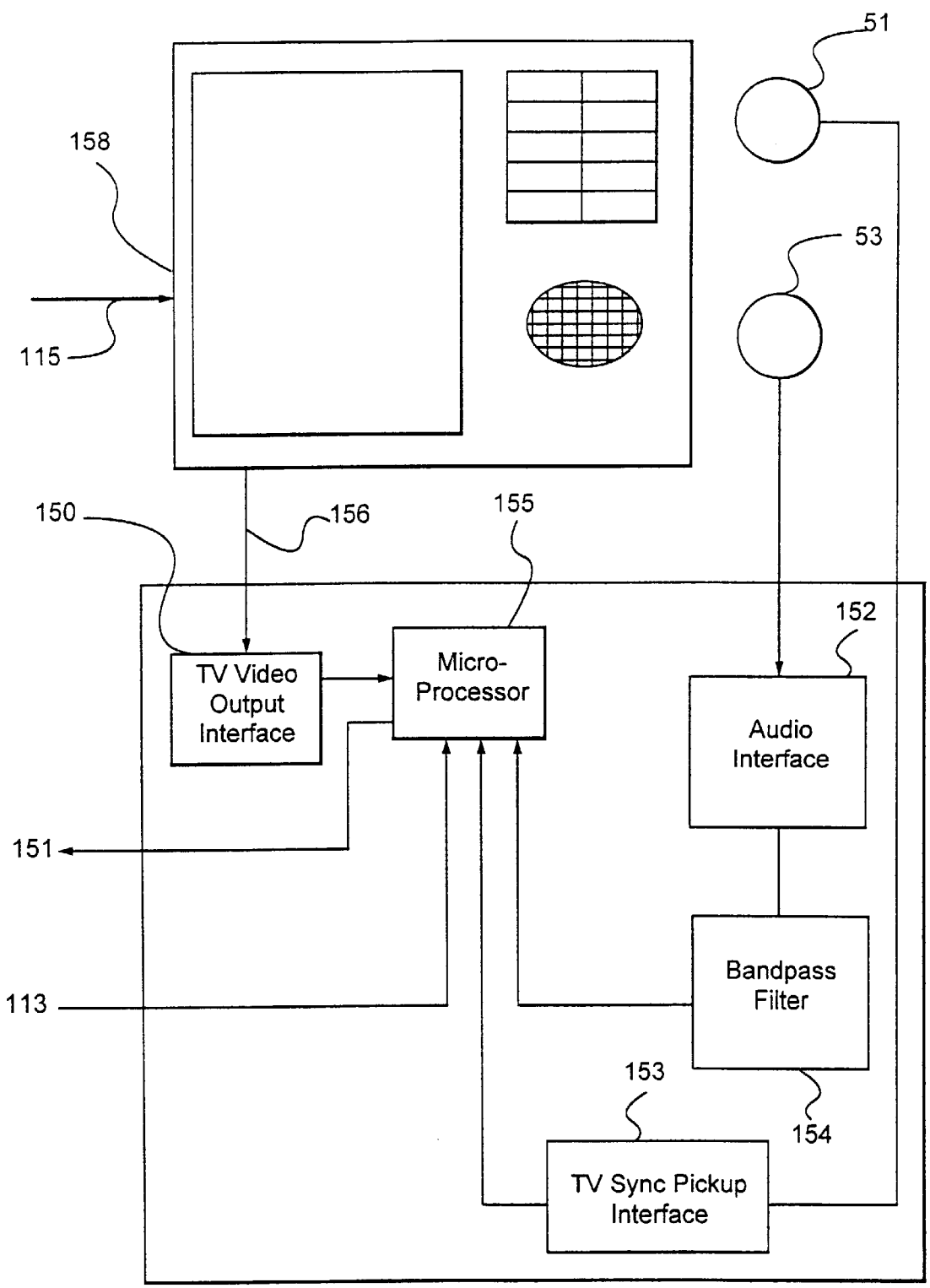
FIG. 2 is a functional block diagram of a remote module of the present invention.

This invention provides audio and video signal matching to produce accurate details of television viewership. The audience measurement system 100 of the present invention comprises a master unit 130 and at least one remote module 150 coupled to master unit 130 via a $1^{st}$ synchronization link 113 and a $1^{st}$ channel match link 151, as illustrated in FIG. 1. Audience measurement system 100 is typically housed in a dwelling having a television cable line 105, wherein the dwelling is, for example, a home, apartment building, hotel, or hospital. Remote module 150 is coupled to magnetic pickup 51, magnetic pickup 53, and TV video output line 156 to monitor the audio signal, video signal, and video synchronization signal emanating from a television 158 during normal operation, as illustrated in FIG. 2. A modified television source signal line 115 is coupled to each one of a plurality of televisions within the dwelling. Signal processing is used by remote module 150 to identify the audio signal, video signal, and the video sync signal generated by television 158. Remote module 150 then generates a channel interval window signal and a television status signal based on the signal processing results. This information is communicated to a master unit 130 (FIG. 1) which stores data relating to each channel being viewed and the duration of the respective channel being viewed, and periodically communicates this data to a central computer (not shown), for example via telephone link 140.

A respective audience measurement system 100 (FIG. 1) is coupled to each television cable line 105 within a dwelling. For example, when there are a plurality of television cable lines 105 coupled to a dwelling, there is correspondingly a respective audience measurement system 100 coupled to each television cable line 105.

Master unit 130 (FIG. 1) performs several functions within audience measurement system 100. Master unit 130 determined the system delay in which each remote unit 150 transmits data to master unit 130 during a learn mode. Master unit 130 generates a priori tag for each respective channel and adds this tag to the 1) audio portion, 2) video portion, or alternatively, 3) both the audio and video portion of a television source signal. The television source signal is typically generated at a cable company and coupled to television cable line 105. The television source signal may alternatively be a broadcast television signal, wherein the broadcast television signal is a radio frequency television signal which is broadcast by a television station and detected by an antenna (not shown). Master unit 130 generates a synchronization signal on synchronization link 113 so that each respective remote module 150 can synchronize to a reference signal, as further discussed below. Master unit 130 also determines whether a channel match condition has been satisfied utilizing a heuristic process, and communicates the result to a central computer (not shown).

Remote module 150 (FIG. 2) passively monitors the 1) audio signal, 2) video signal, or alternatively, 3) both the audio and video signal generated by television 158. Remote module 150 filters the audio signal or the video signal emanating from television 158 so that only the priori tag remains. Remote module 150 then calculates a respective reference time delay, called the window interval signal, so as to provide the time delay of the priori tag to the system reference. Remote unit 150 determines when television 158 is not in operation (OFF) and alternatively when television 158 is in operation (ON). Remote module 150 couples this data to master unit 130. A plurality of remote modules are typically used in audience measurement system 100, wherein each remote module 150 is coupled to a respective television and coupled to master unit 130. FIG. 1 depicts one such illustration wherein three equivalent remote modules 150, 160, and 170 are coupled to master unit 130. Television 158 (FIG. 2) is coupled to remote module 150. A respective television (not shown) is also coupled to each of remote units 160 and 170.

Master Unit

Master unit 130 (FIG. 1) is coupled to television cable line 105. Television cable line 105 comprises a television source signal representing a plurality of television channels, wherein each channel signal has an audio portion and a video portion. For example, the television source signal may comprise 125 channels, as is typical in a cable television network. As noted above, the television source signal may also comprise a broadcast television signal.

Master unit 130 comprises several components, including, a priori tag generator 112, a tuner 118, a timer 116, a summer 109, a digital signal processor (DSP) 120, memory 122, and a communications module 124, as illustrated in FIG. 1. Each of these components cooperate as is further described below.

Tuner 118 may select any one of the channels comprising the television source signal and generate a channel signal having an audio portion and a video portion. The audio portion, or alternatively, the video portion of the source channel signal is coupled to summer 109. Priori tag generator 112 generates a priori tag signal which is also coupled to summer 109. DSP 120 controls the channel selected by tuner 118. Tuner 118 comprises, for example, a PHILIPS tuner, module F1236™, or the like.

Figure 3:
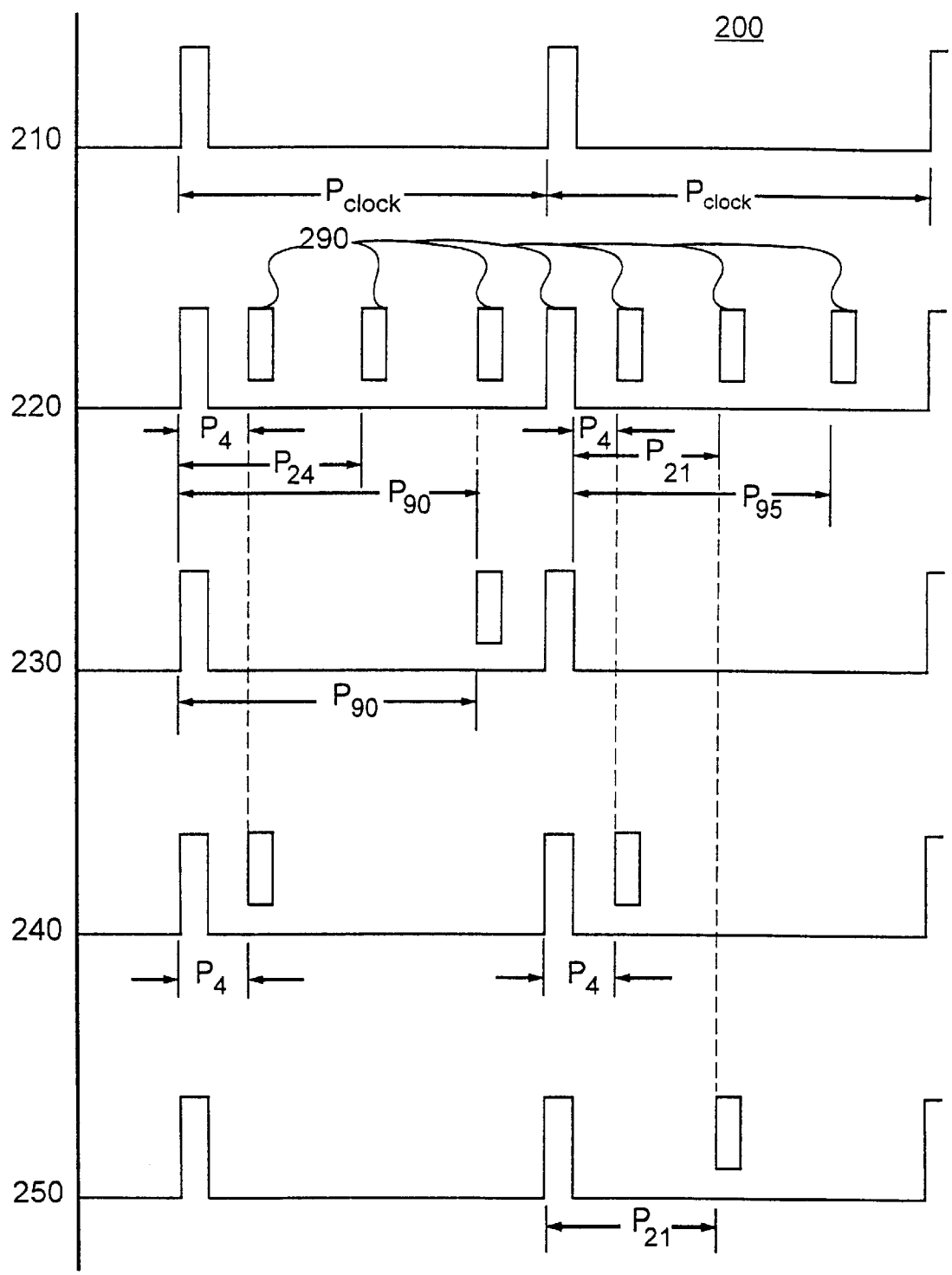
FIG. 3 is a timing diagram of the of the present invention.

Timer 116 generates several timing signals which provide control and timing for DSP 120, tuner 118, priori tag generator 112, memory 122, and communications module 124. Timer 116 also generates a synchronization signal 210 that is coupled to each remote module via a respective $1^{st}$, $2^{nd}$ and $3^{rd}$ synchronization link 113,163 and 173 respectively. It is to be understood that synchronization link 113,163, and 173 comprises any of several types on communications links selected from the group including, but not limited to, a radio frequency communications link, a microwave communications link, a hard-wire link, and a fiber optic communications link. Synchronization signal 210, graphically illustrated in FIG. 3, provides one example of the reference timing signal coupled to remote module 150. Synchronization signal 210 is a periodic signal having a temporal duration or period $P_{clock}$. The period $P_{clock}$ is sufficiently long so that each channel of the television source signal may be assigned to a unique interval window within each period $P_{clock}$. For example, when television source signal has 125 channels the period $P_{clock}$ of synchronization signal 210 is divided into 125 interval windows, wherein each interval window represents one unique channel. Timer 116 provides an equivalent synchronization signal 210 to remote module 160 and remote module 170, via $2^{nd}$ and $3^{rd}$ synchronization signal links 163 and 173, respectively.

Summer 109 is utilized to add the priori tag signal to the 1) the audio portion, 2) the video portion, or 3) alternatively both the audio and video portion of a television source signal to generate a modified television source signal 220 on television source signal line 115. One example of modified television source signal 220 is graphically illustrated in FIG. 3, where the priori tag signal is superimposed on synchronization signal 210 to illustrate the relative position of each priori tag with respect to period $P_{clock}$, which is described more fully below. Modified television source signal 220 is also referred to as a local time coincidence priori signal because the priori tag signal may be identified based on the interval window within synchronization signal 210 in which the priori tag signal resides.

DSP 120 is coupled to each of the components in master unit 14, as illustrated in FIG. 1. DSP 120 controls several of the functions within master unit 130, including the selection of channels by tuner 118, the timing of the priori tag, the determination of a channel match condition, whether television 158 is ON, the storage of channel match information, and the communication with the central computer, as further described below.

DSP 120 controls the selection of television source signal channels by tuner 118 and timing of the priori tag signal. Each channel of television source signal is sequentially selected by DSP 120 based on a pseudo random process. As such, channel selection by DSP 120 is independent of the television channel selected by a viewer. Each channel is selected so that the priori tag signal may be added to the audio portion or alternatively the video portion of the television source signal to generate the modified television source signal. For example, FIG. 3 graphically depicts one case where channels 4 ($P_4$), 24 ($P_{24}$), and 90 ($P_{90}$) are selected during a first period, and channels 4 ($P_4$), 21 ($P_{21}$) and 94 ($P_{94}$) are selected during a next period as part of the process wherein a priori tag is added to modified television source signal 220. In each of these cases a priori tag signal 290, having a preselected frequency, is added to the television source signal. Priori tag signals 290 are depicted as a respective vertically oriented rectangle associated with each channel interval. In the case where the priori tag signal is added to the audio signal portion, the preselected priori tag frequency is selected to be outside the audio range of the typical listener but within the audio range of the typical television amplifier (not shown). For example, the frequency of priori tag signal 290 is about 12,000 Hertz. The preselected frequency of priori tag signal 290 may also be a pseudo random signal which varies within a range that is outside the typical listener's hearing range and also within the operational range of the typical television. For example, the preselected frequency range is from about 10,000 to about 15,000 Hertz.

In the case where the priori tag is added to the video signal portion, the preselected frequency is selected to be outside the viewing range of the viewer but within the video range of the typical television video circuit (not shown). Typically, the priori tag signal is superimposed on an unused portion of the video display signal. For example, the frequency of the priori tag signal is about 200 mega Hertz. The preselected frequency of the priori tag signal may also be a pseudo random signal which varies within a range that is outside the viewing range of the viewer and also within the operational range of the typical television. For example, the preselected frequency range is from about 77 to about 157 mega Hertz in a low band, from about 163 to about 451 mega Hertz in a medium band, and from about 463 to about 765 in a high band.

The above identified channel intervals are represented by periods $P_4$, $P_{21}$, $P_{24}$, $P_{90}$, and $P_{95}$, as illustrated in FIG. 3. Each period has an interval which is referenced by the start time of $P_{clock}$ in synchronization signal 210. As such, each channel is represented by an unique interval within the period of $P_{clock}$. Window interval signals 230, 240, and 250 are generated by a respective remote unit 150, 160, and 170 based on modified television source signal 220, as is described below.

DSP 120 determines whether television 158 is ON by monitoring the television status signal coupled to master unit 130 from remote unit 150, as further described below.

Initialization

Audience measurement system 100 is initialized during an initialization mode to enable DSP 120 to determine the duration of period $P_{clock}$, to ensure that all channels have a unique interval window. The initialization mode may be entered by activating a learn switch 114 (FIG. 1). During normal operation learn switch 114 is deactivated. During the initialization mode the modified TV source signal is coupled to television 158, television 158 having been manually set to any operational channel. DSP 120 next determines the system delay after receiving the interval window signal from remote module 150. The system delay is defined as the temporal interval including the time stamp from which a priori tag signal is added to the preselected channel of the TV source signal until the time stamp in which the priori tag signal is detected by master unit 130, after having been transmitted to master unit 130 from remote unit 150. This system delay is a factor in establishing the minimum duration of the window interval for each channel. The actual duration of the window interval will also be dependent on the priori tag signal duration, and the number of channels which comprise the TV source signal.

Audio Match

DSP 120 determines when a "channel match condition" is satisfied which includes the evaluation of at least one of audio signal matching process and video signal matching process. A $1^{st}$ channel match link 151 is coupled to DSP 120 disposed in master unit 130 from remote module 150. DSP 120 sets an audio match pre-condition flag TRUE when a time coincident priori tag is detected and decoded, as is further described below. A final audio match verification is determined by a logical median filter function within DSP 120. An audio match flag is set TRUE in response to a set audio match pre-condition flag. The logical median filter signals that a match verification has occurred if the audio match flag is TRUE a predetermined number of times within a range of opportunities. When a match is detected, an audio match verified signal is set TRUE. For example, the audio match verified signal is set TRUE when the audio match flag has been TRUE two of the last three opportunities. DSP 120 is well suited for making this determination because DSP 120 determines the timing of the priori tag signal addition to a respective channel, as discussed above. DSP 120 correspondingly receives the interval window signal from $1^{st}$ channel match line 151. Based on these data DSP 120 accurately determines the viewed channel of television 158 by utilizing a heuristic process comprising the determination of the 1) audio match signal, 2) video match signal, or alternatively 3) both the audio match signal and the video match signal, to generate a channel match condition, as is further discussed below.

Video Match

Video matching provides an alternative method of determining the channel being monitored. DSP 120 controls the determination of a video signal match condition. An video match pre-condition flag is set TRUE when the priori tag signal added to the video portion of a respective channel is detected by remote module 150 which then calculates the interval window signal which is subsequently coupled to DSP 120. The final video match verification is determined by the logical median filter. An video match flag is set TRUE in response to a set video match pre-condition flag. The logical median filter signals that a verified match has occurred if the video match flag is TRUE a predetermined number of times within a range of opportunities, as described above. When a verified match is detected, a video match verified signal is set TRUE. Based on the audio match verified signal and the video match verified signal DSP 120 accurately determines the viewed channel of television 158 by utilizing a heuristic process.

Improving Channel Match Accuracy

The establishment of a channel match signal and maintenance of the match is a heuristic process that is determined by the 1) audio match process 2) video match process, or alternatively, both the 3) audio and the video match process. Table 1 below illustrates the decision process. When neither the audio match verified signal nor the video match verified signal indicates that there is a channel match then DSP 120 indicates that there is no channel match by deactivating the channel match signal. If either the video match verified signal or the audio match verified signal indicates that there is a match then DSP 120 indicates that a channel identification has been made by activating the channel match signal. As such, use of the phrase "video match" or "audio match" in this Specification indicates a positive channel identification has been made. The "Conditional" entries in Table 1 are intended to allow various heuristic algorithms to be used when only one video match or alternatively audio match is present at any given instant. One set of heuristics that enables the activation of the channel match signal is the case in which the video match function generates a video match during the period of time before which a verification by the slower audio matching function may make an audio match, thus enabling earlier channel identification based on the video match. Another heuristic enables a channel match to be declared if there is an audio match and the reason for the negative result on the video match was determined to be the presence of a scrambled video sync signal on the television source signal. Table 1 is one example of the match decision matrix, other combinations will also provide a channel match decision matrix. For example, in another embodiment of the present invention, both the video match and the audio match must be TRUE for the channel match signal to be activated.

TABLE 1

Channel Match Decision Matrix

| Channel Match | Audio Match | No Audio Match |
| --- | --- | --- |
| Video Match | True | Conditional |
| No Video Match | Conditional | False |

DSP 120 controls the storage of channel match information in memory 122. When a channel match condition is determined a respective channel match flag is periodically stored in memory 122. A unique channel match flag representing each respective channel in the television source signal may be stored in memory 122. A respective channel duration signal is also stored in memory 122 for each channel match flag.

Finally, DSP 120 controls communications module 124. Periodically, channel match information stored in memory 122 is transmitted to the central computer via communications module 124. DSP 120 may also periodically clear the data in memory 122. For example, memory 122 may be reset after the data stored therein is transmitted to the central computer.

Magnetic Pickups and TV Output Signal Lines

Magnetic pickups 51 and 53 typically comprise magnetic flux sensing pickups which convert the magnetic field flux generated by television 158 into electrical energy. Magnetic pickups 51 and 53 are conveniently illustrated in FIG. 2. Magnetic pickup 51 is positioned sufficiently close to the chassis of television 158 to pick up the magnetic flux generated by the retrace circuits associated with the vertical sync signal and alternatively by horizontal sync signal within television 158. A TV video output line 156 is coupled to the video signal which corresponds with the signal that drives the picture tube display within television 158.

Magnetic pickup 53 is positioned sufficiently close to the audio speaker (not shown) in television 158 to detected the magnetic flux generated by the audio speaker, which flux is representative of the audio signal driving the television speaker. The audio signal is also referred to as the TV audio signal in this Specification. Alternatively, audio pickup 53 is, for example, a line level audio detector which is coupled directly to the audio speaker of the speaker in television 158 and measures the TV audio signal of television 158 directly.

Remote Module

Remote module 150 comprises audio interface 152, bandpass filter 154, video sync interface 153, TV video output interface 159, and microprocessor 155. The modified television source signal is coupled to television 158 via television source signal line 115. Microprocessor 155 comprises, for example, a digital signal processor. Magnetic pickup 53 is disposed to detect the TV audio signal generated by the speakers of television 158. The TV audio signal is coupled to audio interface 152 where it is conditioned to provide a TV audio signal having a constant gain control irrespective of the volume control setting. Unwanted noise is also filtered from the TV audio signal by audio interface 152. Microprocessor 155 adjusts the amplification level of the audio interface to maintain the constant gain control. Next, the audible portion of the TV audio signal is filtered by bandpass filter 154 leaving only the priori tag signal which is subsequently coupled to microprocessor 155.

Magnetic pickup 51 detects the horizontal, or alternatively, the vertical sync signal generated by television 158. The sync signal is coupled to TV sync pickup interface 153 in which the sync signal is filtered and used to trigger a one-shot sync signal having a short duration. The one-shot sync signal is representative of the television sync signal and enables the sync signal to be detected by microprocessor 155. The duration of the one shot may, for example, be about 30 micro-seconds. The one-shot sync signal is coupled to microprocessor 155. Microprocessor 155 determines whether television 158 is OFF or ON based on the sync signal and generates a corresponding television status signal which reflects the operation of television 158. For example, when microprocessor 155 detects sync pulses for one second it sets the television status signal to "TRUE" indicating that television 158 is ON, and when no sync pulses have been detected for one second microprocessor sets the television status signal to "false" indicating that television 158 of OFF. The television status signal is coupled to master unit 130 via $1^{st}$ channel match line 151.

The synchronization signal from master unit 130 is coupled to micro-processor 155. Micro-processor 155 adds the synchronization signal from master unit 130 to the priori tag signal detected from television 158 as described above. The resulting signal generated by micro-processor 155 is the interval window signal, and is represented, for example, by interval window signal 230, as graphically illustrated in FIG. 3. The interval window signal 230 is coupled to microprocessor 155 where it is subsequently transmitted to master unit via $1^{st}$ channel match line 151.

Interval Window Signal

The $1^{st}$ interval window signal 230 is conveniently illustrated in FIG. 3 to graphically show that interval window signal 230 is synchronized with synchronization signal 210. When, for example, television 158 is tuned to channel 90, the priori tag signal for channel 90 is added to synchronization signal 210 by remote unit 150 as described above. The relative position of the priori tag for channel 90 is disposed within the interval window for channel 90, and has a period of $P_{90}$. As such microprocessor 155 generates an interval window signal 230 representative of the period $P_{90}$. A interval window signal is coupled to DSP 120 via $1^{st}$ channel match line 151.

Again, by way of example, $2^{nd}$ interval window signal 240 indicates that remote monitor 160 has detected the priori tag signal on channel 4, and the $3^{rd}$ interval window signal 250 indicates that remote monitor 170 has detected the priori tag signal on channel 21. As such, remote module 160 transmits to master unit 130 via $3^{rd}$ channel match line 161 a interval window signal for channel 4. Correspondingly, remote module 170 transmits to master unit 130 via channel match line 175 a interval window signal for channel 21.

It is to be understood that $1^{st}$ channel match link 151, $2^{nd}$ channel match link 165, and $3^{rd}$ channel match link 175 comprise a link selected from the group including, but not limited to, a radio frequency link, a micro-wave link, a hard-wire link, and alternatively an optical cable link.

Central Computer

A central computer (not shown) collects data from TV audience monitor system 10, preferably a plurality of TV audience monitor systems 10, for determining viewership habits of several families. TV monitor system 10 communicates to the central computer periodically. By way of example and not limitation, communication by TV monitor system 10 occurs via telephone link 140. DSP 120 senses a remote phone going off hook at any time during communications activity via telephone link 140 and appropriately interrupts communication of TV monitor system 10 with the central computer.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An audience measurement system for determining the channel to which at least one television is tuned when said respective television is in operation, said system being coupled to a television source signal comprising a video signal portion and an audio signal portion, the system comprising:

a master unit comprising a digital signal processor and coupled to said television source signal, wherein said master unit is adapted to generate a synchronization signal and a pseudo random priori tag signal, wherein said master unit is adapted to generate a modified television source signal having the priori tag signal superimposed on the audio portion and on the video portion of said television source signal; and at least one remote unit comprising a microprocessor and coupled to said master unit and coupled to said respective television, wherein said at least one remote unit is adapted to detect the synchronization signal and the modified television source signal;

wherein said microprocessor of the at least one remote unit generates a respective interval window signal representative of the priori tag signal superimposed on the modified television source signal, the at least one remote unit providing the interval window signal and a television status signal to the master unit;

wherein said master unit is adapted to generate a respective channel match signal in response to the detection of said respective priori tag signal from at least the respective interval window signal received from said at least one remote unit, wherein the respective channel match signal is representative of the channel to which said respective television is tuned.

2. The system as recited in claim 1, further comprising at least one magnetic pickup being coupled to said respective remote module, wherein said at least one magnetic pickup is disposed sufficiently close to said respective television to pickup electromagnetic radiation generated by said respective television.

3. The system as recited in claim 2, wherein said master unit is adapted to generate a modified television source signal having the priori tag signal superimposed on the video portion said television source signal.

4. The audience measurement system as recited in claim 3, further comprising a television video output line coupled to said respective television and coupled to said respective remote module, wherein said television video output line is adapted to detect the video signal generated by said respective television.

5. The system as recited in claim 2, wherein said master unit is adapted to generate a modified television source signal having the priori tag signal superimposed on the audio portion said television source signal.

6. The audience measurement system as recited in claim 5, wherein said at least one magnetic pickup generates an audio signal, wherein said audio signal corresponds to the audio output of said respective television.

7. The audience measurement system as recited in claim 2, wherein said at least one magnetic pickup generates a video sync signal, wherein said video sync signal corresponds with the video sync signal generated by said respective television.

8. The audience measurement system as recited in claim 1, wherein said master unit further comprises:
    a summer, wherein said summer is adapted to add the priori tag signal to the television source signal so as to generate the modified television source signal;
    a tuner coupled to said digital signal processor and coupled to said summer, wherein said tuner may select any one of a plurality of channels from the television source signal and separate each channel into a video portion and an audio portion;
    a priori tag signal generator coupled to said summer and coupled to said digital signal processor, wherein said priori tag signal generator is adapted to generate the pseudo random priori tag signal; and
    a timer, coupled to said digital signal processor, wherein said timer is adapted to generate the synchronization signal.

9. The audience measurement system as recited in claim 1, wherein said remote module further comprises:
    an audio signal interface coupled to at least one magnetic pickup, wherein said audio interface is adapted to generate the audio signal;
    a band pass filter coupled to said audio signal interface and coupled to said microprocessor, wherein said bandpass filter is adapted to filter a portion of the audio signal so that only the priori tag signal remains; and
    a TV sync pickup interface coupled to said at least one magnetic pickup and coupled to said microprocessor, wherein said TV sync pickup interface is adapted to generate a one-shot sync pulse from which the television status signal is determined.

10. The audience measurement system as recited in claim 9, wherein said remote unit further comprises a TV video output interface coupled to said video output line and coupled to said microprocessor, wherein said TV video output interface is adapted to generate the video signal.

11. The audience measurement system as recited in claim 9, wherein said master unit further comprises a communications module coupled to said digital signal processor, wherein said communications module is adapted to periodically communicate viewership information to an external source.

12. The audience measurement system as recited in claim 11, wherein said viewership information comprises the channel to which a respective television is tuned and the interval of time in which the respective television is tuned to said channel.

13. A method of determining the channel to which at least one television is tuned when said respective television is in operation using a system comprising a master unit and a remote unit, the master unit being coupled to a television source signal comprising a video signal portion and an audio signal portion, the method comprising the steps of:
    generating a pseudo random priori tag signal using a digital signal processor of the master unit;
    superimposing said priori tag signal on the television source signal using the master unit and creates a modified television source signal;
    generating a synchronization signal using the master unit;
    detecting the synchronization signal using the remote unit;
    generating a respective interval window signal using a microprocessor of the remote unit, the respective interval window signal representative of the priori tag signal superimposed on the modified television source signal;
    providing the respective interval window signal from the remote unit to the master unit; and
    determining the channel to which the television is tuned by detecting said priori tag signal and using at least the respective interval window signal received from the remote unit.

14. The audience measurement method as recited in claim 13, wherein the step of determining the channel to which said respective television is tuned further comprises the step of separating the priori tag signal from the audio portion of the respective television audio output.

15. The audience measurement method as recited in claim 13, wherein the step of determining the channel to which said respective television is tuned further comprises the step of separating the priori tag signal from the video portion of the respective television video output.

16. The audience measurement method as recited in claim 13, further comprising the step of determining when said respective television is in operation.

17. The audience measurement method as recited in claim 16, wherein the step of determining when said respective television is in operation further comprises the step of monitoring the sync pulses emanating from said respective television and generating a respective television status signal based on the number of sync pulses generated within a specified time interval.

18. The audience measurement method as recited in claim 17, further comprising the step of communicating viewership information to an external device, wherein said viewership information comprises the channel to which said respective television is tuned and the interval of time in which said respective television is tuned to said respective channel.

19. An audience measurement system for determining the channel to which at least one television is tuned when said respective television is in operation, said system being coupled to a television source signal comprising a video signal portion and an audio signal portion, the system comprising:
    a master unit coupled to said television source signal, the master unit comprising:
        a digital signal processor;
        a priori tag signal generator coupled to said digital signal processor, wherein said priori tag signal generator is adapted to generate a pseudo random priori tag signal;

a summer connected to the a prior tag signal generator, wherein said summer is adapted to superimpose the priori tag signal on the audio portion and on the video portion of the television source signal so as to generate the modified television source signal;

a tuner coupled to said digital signal processor and coupled to said summer, wherein said tuner may select any one of a plurality of channels from the television source signal and separate each channel into a video portion and an audio portion; and a timer, coupled to said digital signal processor, wherein said timer is adapted to generate a synchronization signal at least one remote unit coupled to said master unit and coupled to said respective television, the at least one remote unit comprising:

a microprocessor that is adapted to couple a television status signal and the interval window signal to said master unit;

an audio signal interface coupled to at least one magnetic pickup, wherein said audio interface is adapted to generate the audio signal;

a band pass filter coupled to said audio signal interface and coupled to said microprocessor, wherein said bandpass filter is adapted to filter a portion of the audio signal so that only the priori tag signal remains; and a TV sync pickup interface coupled to said at least one magnetic pickup and coupled to said microprocessor, wherein said TV sync pickup interface is adapted to generate a one-shot sync pulse from which a television status signal is determined;

wherein said at least one remote unit is adapted to detect the synchronization signal and the modified television source signal;

wherein said microprocessor of the at least one remote unit generates a respective interval window signal representative of the priori tag signal superimposed on the modified television source signal, the at least one remote unit providing the interval window signal and the television status signal to the master unit;

wherein said master unit is adapted to generate a respective channel match signal in response to the detection of said respective priori tag signal from at least the respective interval window signal received from said at least one remote unit, wherein the respective channel match signal is representative of the channel to which said respective television is tuned.

20. A method of determining the channel to which at least one television is tuned when said respective television is in operation using a system comprising a master unit and a remote unit, the master unit being coupled to a television source signal comprising a video signal portion and an audio signal portion, the method comprising the steps of:

generating a pseudo random priori tag signal using the master unit;

superimposing said priori tag signal on the television source signal using the master unit and creates a modified television source signal;

generating a synchronization signal using the master unit;

detecting the synchronization signal using the remote unit;

generating a respective interval window signal using the remote unit, the respective interval window signal representative of the priori tag signal superimposed on the modified television source signal;

providing the respective interval window signal from the remote unit to the master unit; and separating the priori tag signal from the audio portion of the respective television audio output and from the video portion of the respective television video output;

determining the channel to which the television is tuned by detecting said priori tag signal and using at least the respective interval window signal received from the remote unit.

\* \* \* \* \*